(12) United States Patent
Tanaka et al.

(10) Patent No.: US 7,839,627 B2
(45) Date of Patent: Nov. 23, 2010

(54) PORTABLE ELECTRONIC APPARATUS

(75) Inventors: Hirotoshi Tanaka, Nagano (JP);
Yoshihito Ichiyama, Kanagawa (JP);
Yasuo Fukui, Tokyo (JP)

(73) Assignee: Sony Corporation, Tokyo (JP)

( * ) Notice: Subject to any disclaimer, the term of this patent is extended or adjusted under 35 U.S.C. 154(b) by 145 days.

(21) Appl. No.: 12/098,714

(22) Filed: Apr. 7, 2008

(65) Prior Publication Data
US 2008/0266763 A1 Oct. 30, 2008

(30) Foreign Application Priority Data
Apr. 25, 2007 (JP) ............................ 2007-115475

(51) Int. Cl.
*G06F 1/16* (2006.01)

(52) U.S. Cl. .............................. 361/679.3; 361/679.55; 361/679.56; 312/223.1; 312/223.2; 235/472.01; 235/472.02

(58) Field of Classification Search ............ 361/679.02; D13/168; D14/218
See application file for complete search history.

(56) References Cited

U.S. PATENT DOCUMENTS

| | | | | |
|---|---|---|---|---|
| D219,028 S | * | 10/1970 | Miller et al. ................ D14/218 |
| 4,745,397 A | * | 5/1988 | Lagerbauer et al. ............ 341/23 |
| D319,430 S | * | 8/1991 | Cheng ........................ D13/168 |
| D363,287 S | * | 10/1995 | Laituri ....................... D14/218 |
| D378,512 S | * | 3/1997 | Lee et al. .................... D13/168 |
| 5,801,918 A | * | 9/1998 | Ahearn et al. .......... 361/679.55 |
| D407,071 S | * | 3/1999 | Keating ...................... D13/168 |
| 5,917,906 A | * | 6/1999 | Thornton ................ 379/433.07 |
| D424,060 S | * | 5/2000 | Baker et al. ................. D14/218 |
| 6,123,401 A | * | 9/2000 | Chiba et al. ................... 312/328 |
| D450,314 S | * | 11/2001 | Mattis ........................ D14/218 |
| 6,407,911 B1 | * | 6/2002 | Spence et al. ............ 361/679.3 |
| D492,665 S | * | 7/2004 | Lee ............................ D14/218 |
| D515,041 S | * | 2/2006 | Yun et al. ................... D13/168 |
| D515,557 S | * | 2/2006 | Okuley ....................... D14/218 |
| D531,588 S | * | 11/2006 | Peh ............................ D13/168 |
| D543,196 S | * | 5/2007 | Krzyzanowski et al. ..... D14/218 |
| D548,197 S | * | 8/2007 | Yen et al. ................... D13/168 |
| 7,295,430 B2 | * | 11/2007 | Ohtaki et al. ........... 361/679.55 |
| D565,555 S | * | 4/2008 | Goto ......................... D14/218 |
| D573,548 S | * | 7/2008 | Chouji et al. .............. D13/168 |
| D578,967 S | * | 10/2008 | Kumano .................... D13/168 |
| D602,473 S | * | 10/2009 | Moller et al. .............. D14/218 |
| 2003/0223182 A1 | * | 12/2003 | Yurugi ....................... 361/679 |
| 2004/0090448 A1 | * | 5/2004 | Litwiller ..................... 345/702 |
| 2004/0210933 A1 | * | 10/2004 | Dresti et al. ................. 725/40 |
| 2005/0200598 A1 | * | 9/2005 | Hayes et al. ................ 345/156 |
| 2005/0270735 A1 | * | 12/2005 | Chen .......................... 361/683 |
| 2006/0046031 A1 | * | 3/2006 | Janevski .................. 428/195.1 |

(Continued)

*Primary Examiner*—Jayprakash N Gandhi
*Assistant Examiner*—Anthony Q Edwards
(74) *Attorney, Agent, or Firm*—Oblon, Spivak, McClelland, Maier & Neustadt, L.L.P.

(57) ABSTRACT

Provided is a portable electronic apparatus. The portable electronic apparatus includes a casing, an operation portion, and a finger placement portion. The casing includes a front surface and a back surface. The operation portion is disposed at a first position on the front surface and is operated with a first finger of a user for an input. The finger placement portion is disposed at a second position on the back surface. The second position corresponds to the first position. The finger placement portion guides a second finger of the user to be capable of being placed thereon.

8 Claims, 9 Drawing Sheets

U.S. PATENT DOCUMENTS

2006/0054704 A1* 3/2006 Fitch et al. ............. 235/472.01
2006/0158838 A1* 7/2006 Kinoshita et al. ........... 361/681
2006/0288300 A1* 12/2006 Chambers et al. ........... 715/744
2007/0063048 A1* 3/2007 Havens et al. .......... 235/462.46
2007/0153452 A1* 7/2007 Harmon et al. ............. 361/679

* cited by examiner

PORTABLE ELECTRONIC APPARATUS

CROSS REFERENCES TO RELATED APPLICATIONS

The present invention contains subject matter related to Japanese Patent Application JP 2007-115475 filed in the Japanese Patent Office on Apr. 25, 2007, the entire contents of which being incorporated herein by reference.

BACKGROUND OF THE INVENTION

1. Field of the Invention

The present invention relates to a portable electronic apparatus, such as a remote controller, including an operation portion capable of being operated with a user's finger.

2. Description of the Related Art

In related art, there has been proposed a portable electronic apparatus including an operation portion capable of being operated with a user's finger while the user holds a casing. For example, Japanese Patent Application Laid-open No. 2006-165917 (e.g., paragraph 0018) discloses a remote control apparatus including a touch sensor as the operation portion.

SUMMARY OF THE INVENTION

However, in the remote control apparatus described in Japanese Patent Application Laid-open No. 2006-165917 (e.g., paragraph 0018), the user has to operate the touch sensor with a finger (e.g., thumb) while holding a casing of the remote control apparatus with other fingers. It is therefore difficult to stabilize a position of the finger with which the touch sensor is operated. This forces the user to consciously adjust the finger position to make the operation easy, or adjust an angle of the finger with respect to the operation surface of the touch sensor so as not to touch the touch sensor with a finger cushion, that is, so as to touch the touch sensor with a fingertip. As a result, operability of the remote control apparatus is impaired.

In view of the above-mentioned circumstances, it is desirable to provide a portable electronic apparatus capable of improving the operability by stabilizing the finger position of the user.

According to an embodiment of the present invention, there is provided a portable electronic apparatus. The portable electronic apparatus includes a casing, an operation portion, and a finger placement portion. The casing includes a front surface and a back surface. The operation portion is disposed at a first position on the front surface and operated with a first finger of a user for an input. The finger placement portion is disposed at a second position on the back surface, the second position corresponds to the first position, and the finger placement portion guides a second finger of the user to be capable of being placed thereon.

Herein, for example, the first finger is a thumb and the second finger is a forefinger. Further, the portable electronic apparatus refers to, for example, an electronic apparatus such as a mobile phone, a portable game machine, portable AV (audiovisual) equipment, or an electronic dictionary, or a remote controller for remotely controlling an electronic apparatus such as a PC (personal computer) and a television set. With this structure, the position of the operation portion of the front surface corresponds to the position of the finger placement portion of the back surface. Thus, when the second finger is placed on the finger placement portion, the first finger is stabilized at the position opposed to the operation portion, with the result that the operability can be improved.

The portable electronic apparatus may further include a containing portion and a battery cover. The containing portion is disposed at the back surface and capable of containing a battery. The battery cover is protruded from the second position of the back surface so as to cover the containing portion and form the finger placement portion.

With this structure, the battery cover of the back surface can double as the finger placement portion. Therefore, the operability can be improved while protecting the battery and the containing portion thereof.

In the portable electronic apparatus, the operation portion may be a touch pad including an operation surface which is in parallel to the front surface and positioned closer to the back surface than the front surface is.

With this structure, the user can more easily touch the operation surface of the touch pad with the fingertip of the first finger in a more orthogonal direction. As a result, the operability of the touch pad can be improved.

In this case, the touch pad is capable of being subjected to a scroll operation with the first finger of the user for an input. The touch pad may include a scroll guide portion provided to the operation surface and tactually guiding the first finger of the user to tell the user an operation direction and an operation position of the scroll operation.

With this structure, the user can easily perform the scroll operation by touching the scroll guide portion, without visually checking the operation surface of the touch pad.

As described above, according to the embodiment of the present invention, the portable electronic apparatus capable of improving the operability by stabilizing the finger position of the user can be provided.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, with reference to the accompanying drawings, embodiments of the present invention will be described.

Figure 1:
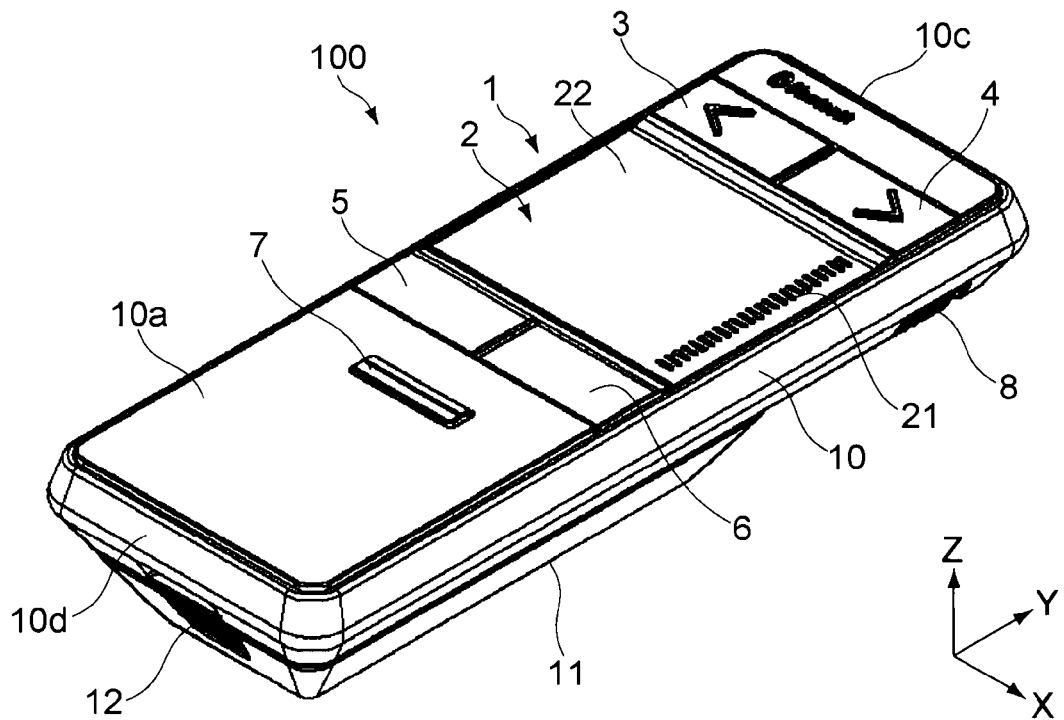
FIG. 1 is a front side perspective view of a remote controller according to an embodiment of the present invention.
Figure 2:
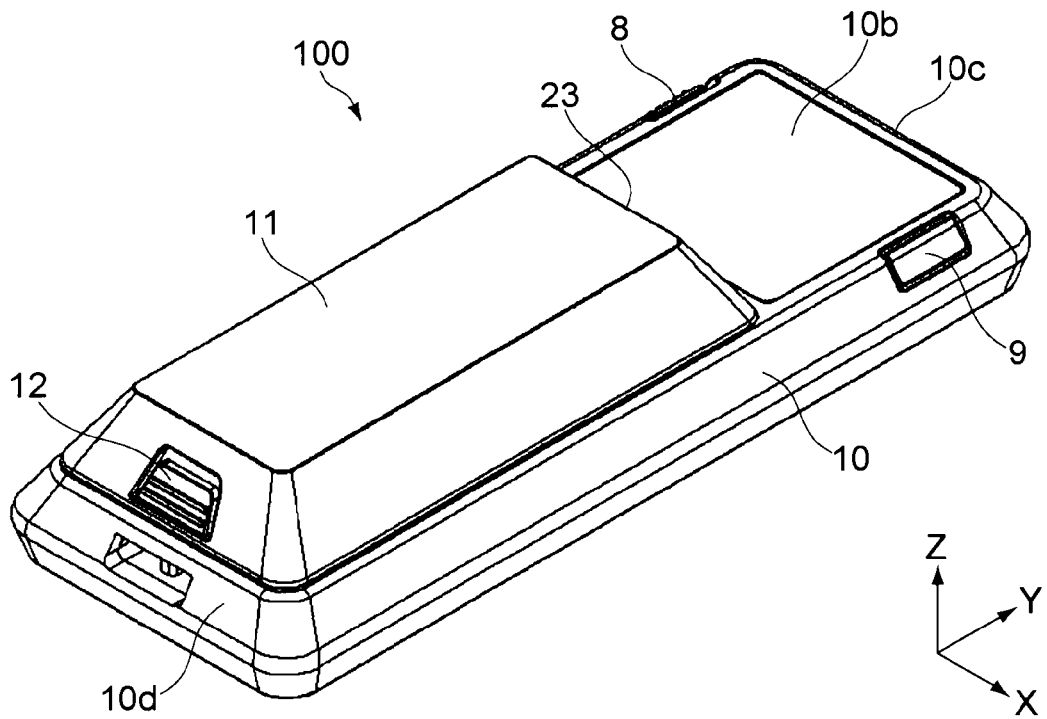
FIG. 2 is a back side perspective view of the remote controller according to the embodiment of the present invention.
Figure 3:
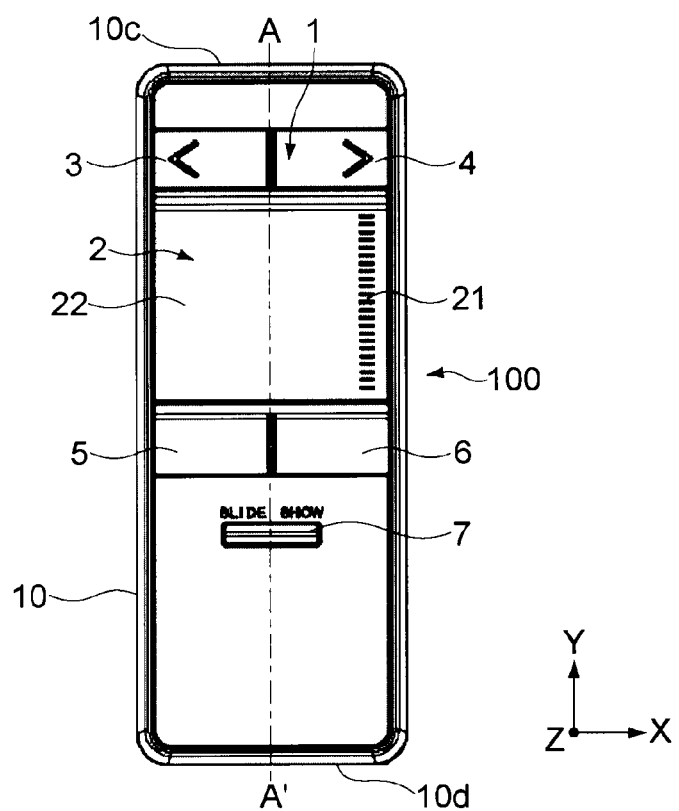
FIG. 3 is a front view of the remote controller according to the embodiment of the present invention.
Figure 4:
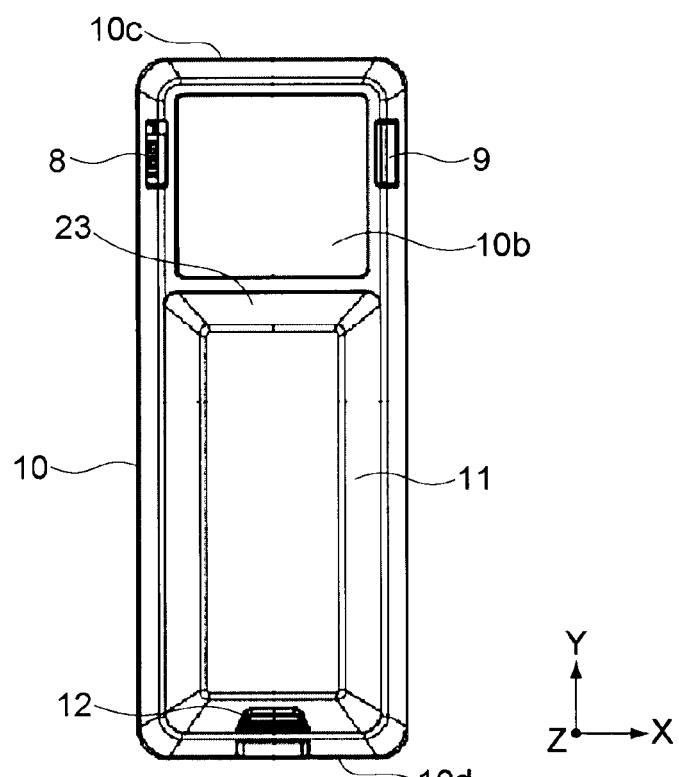
FIG. 4 is a back view of the remote controller according to the embodiment of the present invention.
Figure 5:
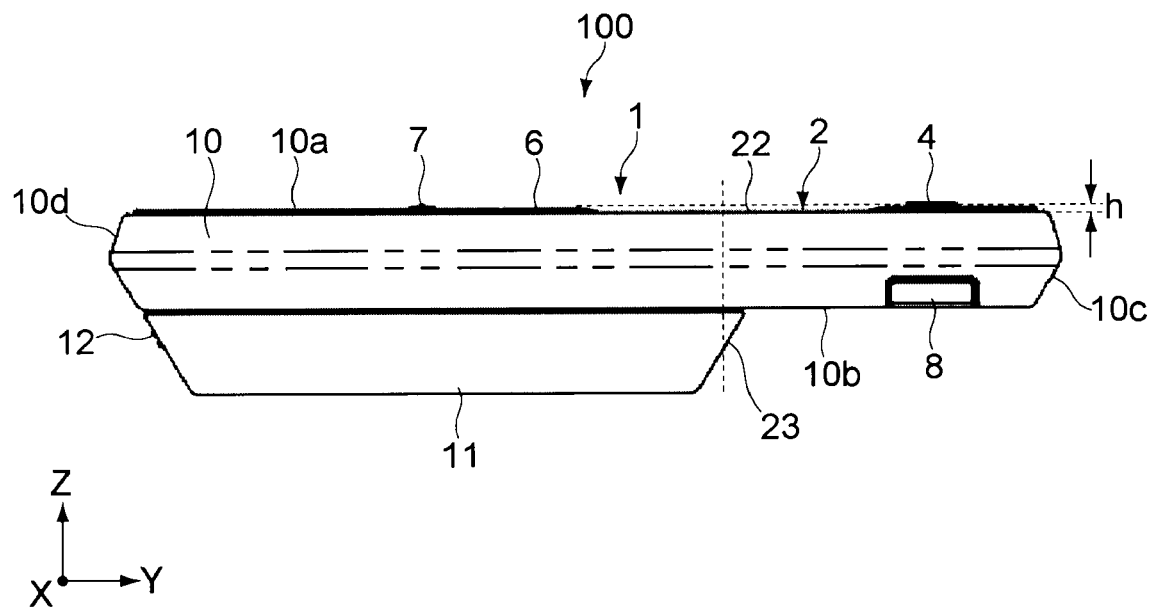
FIG. 5 is a right side view of the remote controller according to the embodiment of the present invention.
Figure 6:
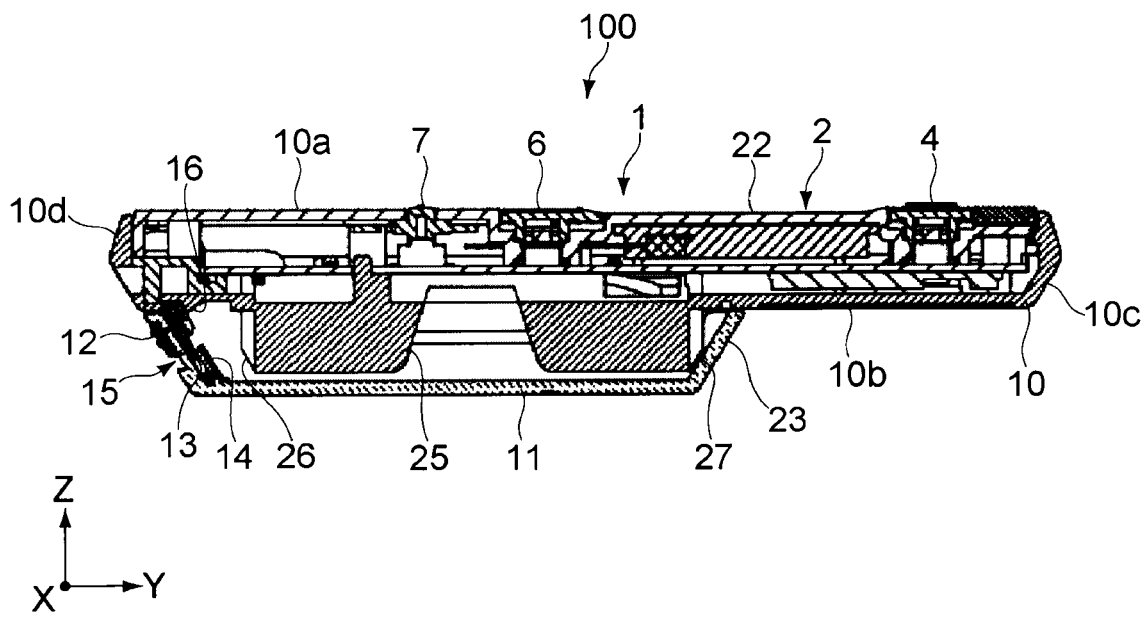
FIG. 6 is a sectional view of the remote controller taken along the line A-A' of FIG. 3.

FIG. 1 is a front side perspective view of a remote controller 100 according to an embodiment of the present invention. FIG. 2 is a back side perspective view of the remote controller 100. FIG. 3 is a front view of the remote controller 100. FIG. 4 is a back view of the remote controller 100. FIG. 5 is a right side view of the remote controller 100. FIG. 6 is a sectional view of the remote controller 100 taken along the line A-A' of FIG. 3.

As shown in those figures, the remote controller 100 according to this embodiment includes an operation portion 1 provided on a front surface 10a of a casing 10 and a battery cover 11 provided on a back surface 10b. The casing 10 and the battery cover 11 are made of a resin, for example.

It should be noted that the remote controller 100 functions as a remote controller dedicated to software for presentation (hereinafter, referred to as presentation software), such as "Microsoft PowerPoint (registered trademark)", installed on an electronic apparatus such as a PC (not shown). Specifically, the remote controller 100 causes a display of the PC or a screen for a projector to display a plurality of slides and remotely controls the slides while the presentation software is running. The remote controller 100 is connected to the PC via a communication standard such as Bluetooth (registered trademark).

As shown in FIGS. 1, 3, 5, and 6, the operation portion 1 includes a touch pad 2, a slide return button 3, a slide advance button 4, a left button 5, a right button 6, and a slide show button 7. The touch pad 2 is subjected to an operation such as a pointer shift or a scroll for input while the presentation software is running. The slide return button 3 is used for returning a slide displayed to the previous one. The slide advance button 4 is used for advancing a slide displayed to the next one. The left and right buttons 5 and 6 are used for input through operations of left and right clicks, respectively, in conjunction with the touch pad 2. The slide show button 7 is used for successively displaying a series of slides at a predetermined time interval, in brief, running a so-called slide show.

As shown in FIG. 5, a pad surface 22 of the touch pad 2 is positioned lower (i.e., closer to the back surface 10b) than the front surface 10a by a distance h in a Z direction of FIG. 5. The front surface 10a is provided with other operation portions such as the slide advance button 4 and the right button 6.

In addition, as shown in FIGS. 1 and 3, at an end portion of the touch pad 2 in an X direction of those figures, a linear scroll guide portion 21 extending in a Y direction is provided. For example, the scroll guide portion 21 is constituted of a plurality of convex portions protruded from the pad surface 22 in succession. On the touch pad 2, the finger of the user is tactually guided to tell the user a position and a direction for execution of a scroll operation. In other words, a user consciously traces the convex portions of the scroll guide portion 21 and can thereby perform the scroll operation. Thus, with the scroll guide portion 21, the user can perform the scroll operation while watching the slide displayed on the display or the screen without looking at the touch pad 2.

Further, as shown in FIGS. 1 to 5, on an upper right side surface of the casing 10, a power button 8 tuning on/off the power of the remote controller 100 is provided. On an upper left side surface of the casing 10, a connect button 9 connecting with the electronic apparatus such as the PC via Bluetooth (registered trademark) to start communication is provided so as to correspond to the power button 8.

As shown in FIG. 6, on the back surface 10b of the casing 10, a battery containing portion 25 containing the battery supplying power to the remote controller 100 is provided. The battery cover 11 covers the battery containing portion 25 and can be opened and closed. It should be noted that the battery contained in the battery containing portion 25 is, for example, a AAA battery, but is not limited thereto.

Figure 7:
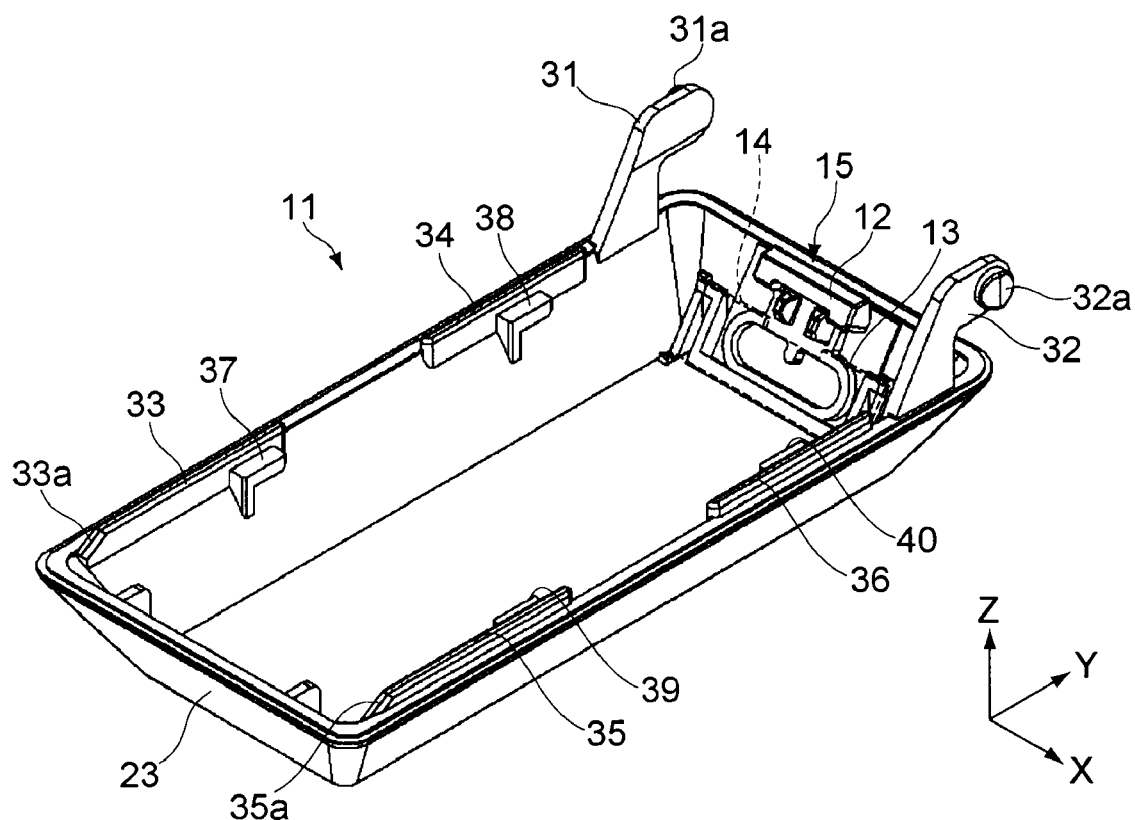
FIG. 7 is a perspective view showing an inside of a battery cover of the remote controller according to the embodiment of the present invention.
Figure 8:
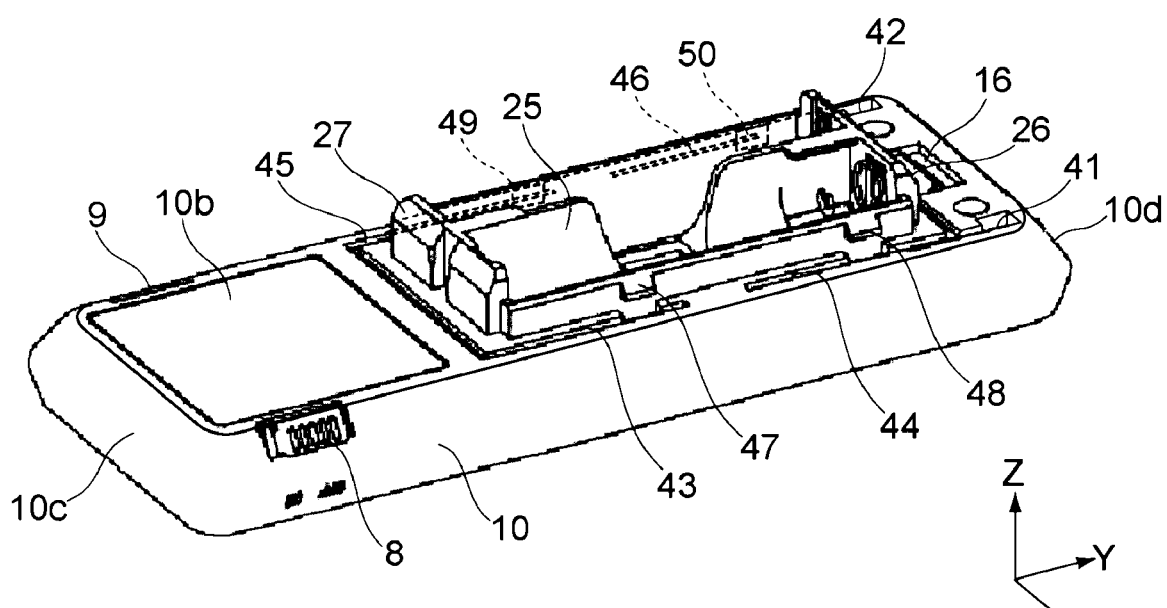
FIG. 8 is a back side perspective view of the remote controller whose battery cover is detached in the embodiment of the present invention.

FIG. 7 is a perspective view showing an inside of the battery cover 11. FIG. 8 is a back side perspective view of the remote controller 100 whose battery cover 11 is detached.

As shown in FIGS. 2 and 4 to 7, the battery cover 11 is provided so as to protrude from the back surface 2b. Further, a cross section in an x-y plane is gradually reduced in the Z direction and four lateral side surfaces of the battery cover form trapezoid. On an end portion of the battery cover 11 on a top surface 10c side of the casing 10, a finger placement portion 23 is formed. A user places the finger (e.g., a forefinger) on the finger placement portion 23, when performing the remote control with the remote controller 100. As shown in FIG. 5, the finger placement portion 23 is positioned roughly corresponding to a center of the touch pad 2 provided on the front surface 10a.

As shown in FIGS. 6 and 8, on an end portion of the battery cover 11 on a bottom surface 10d side of the casing 10, a lock mechanism 15 is provided. The lock mechanism 15 locks/unlocks the battery cover 11 to/from the back surface 10b. The lock mechanism includes an unlock button 12, a biasing member 13, and a nail portion 16. The unlock button 12 is exposed from the surface of the battery cover 11 (see FIGS. 2 and 4). The biasing member 13 biases the unlock button 12 to the back surface 10b side. The nail portion 16 is provided on the back surface 10b. As shown in FIG. 7, the biasing member 13 is made of a flexible member which can be bent and is ring-shaped, and is connected to the unlock button 12. Further, the biasing member 13 is covered with a rectangular cover sheet 14 which forms a slope approximately along the bottom surface 10d. Further, as shown in FIGS. 6 and 8, the nail portion 16 is provided to the end portion of the back surface 10b on the bottom surface 10d side and is engaged with the unlock button 12. Because the unlock button 12 is engaged with the nail portion 16 while being biased by the biasing member 13, the battery cover 11 is locked to the back surface 10b side. The operation of the lock mechanism 15 will be described later.

As shown in FIG. 7, on the inner periphery of the battery cover 11, four convex portions 33, 34, 35, and 36 extending in the Y direction are provided. As shown in FIG. 8, on the periphery of the battery containing portion 25, slide grooves 43, 44, 45, and 46 respectively corresponding to the convex portions 33, 34, 35, and 36 are provided. At the slide grooves 43 to 46, the battery cover 11 is guided and slid from the bottom surface 10d side to the top surface 10c side with the battery cover 11 unlocked by the lock mechanism 15. It should be noted that as shown in FIG. 7, at the end portions of the convex portions 33 and 35 of the battery cover 11 on the top surface 10c side, slopes 33a and 35a are formed, respectively. The function of the slopes 33a and 35a will be described later.

As shown in FIG. 7, on the inner surface of the battery cover 11, L-letter shaped engagement portions 37, 38, 39, and 40 are provided so as to correspond to the convex portions 33 to 36, respectively. Meanwhile, at positions corresponding to the slide grooves 43 to 46 of the battery containing portion 25, protrusions 47, 48, 49, and 50 capable of engaging with the engagement portions 37 to 40, respectively, are provided. When the battery cover 11 is locked, the lock mechanism 15 locks the battery cover 11 so as not to slide. Further, because the engagement portions 37 to 40 engage with the protrusions 47 to 50 of the battery containing portion 25, respectively, the battery cover 11 is locked so as not to rotate (not to be opened and closed).

In addition, as shown in FIG. 8, the battery containing portion 25 includes two concave portions capable of containing two dry cell batteries, for example. On both end portions of the concave portions in the Y direction, slopes 26 and 27 fitted to the configuration of the battery cover 11 are formed.

Further, as shown in FIG. 7, on both end portions of the battery cover 11 in the X direction, in proximity to the side where the lock mechanism 15 is provided, rotation axis portions 31 and 32 are provided for opening and closing the battery cover 11 through rotation. The rotation axis portions 31 and 32 extend by a predetermined distance in the Z direction (toward the back surface 10b side) from the periphery of the battery cover 11, bend toward the bottom surface 10d side in the Y direction, and has elasticity to some extent. At end portions of the rotation axis portions 31 and 32, columnar bosses 31a and 32a are provided so as to protrude outwardly in the X direction. The bosses 31a and 32a function as a rotation stopper when the battery cover 11 is rotated and opened. On the other hand, as shown in FIG. 8, at positions of the back surface 10b corresponding to the rotation axis portions 31 and 32, engagement holes 41 and 42 engaging with the rotation axis portions 31 and 32, respectively, are provided. The rotation axis portions 31 and 32 rotate while engaging with the engagement holes 41 and 42 to thereby open and close the battery cover 11. The rotation operation thereof will be described later in detail.

It should be noted that the remote controller 100 includes a control circuit, a storage apparatus, and a communication circuit (not shown). The control circuit is, for example, a CPU (central processing unit) generating a remote control signal according to an operation inputted through the operation portion 1 by a user. Examples of the storage apparatus include a RAM (random access memory) and a ROM (read only memory). The communication circuit is used for sending the remote control signal via Bluetooth mentioned above.

Figure 9:
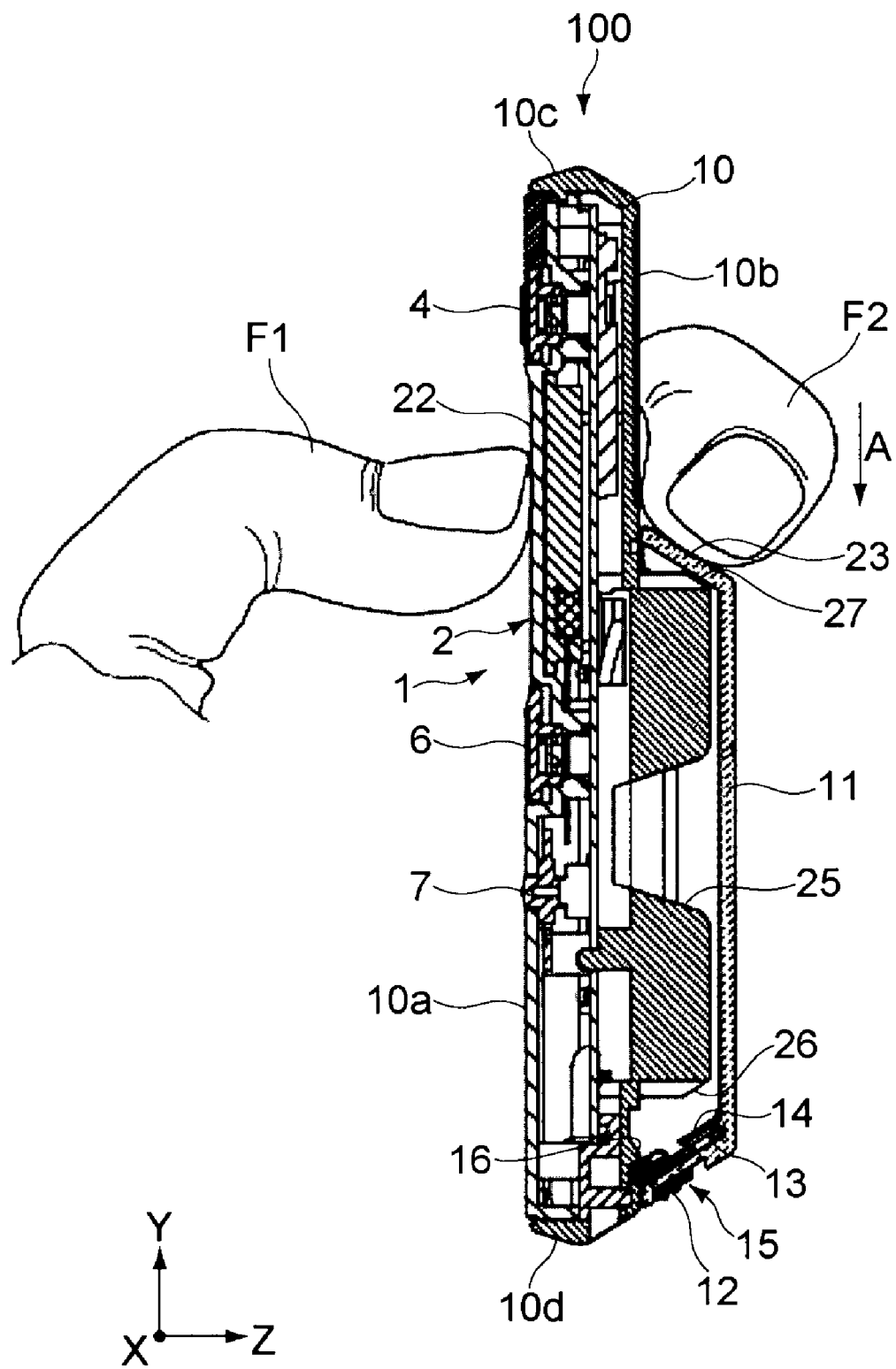
FIG. 9 shows an operation state in which a user operates the remote controller according to the embodiment of the present invention.

FIG. 9 shows an operation state in which a user operates the remote controller 100. As shown in FIG. 9, when performing the remote control on the presentation software by using the remote controller 100, the user places a forefinger F2 on the finger placement portion 23 on the back surface 10b side and performs various operations of the operation portion 1 including the touch pad 2 with a thumb F1 on the front surface 10a side. As described above, the finger placement portion 23 is positioned approximately corresponding to the center of the touch pad 2. Therefore, the thumb F1 is stabilized at the position facing the touch pad 2, which can improve the operability. Further, the operation of the touch pad 2 requires that the thumb F1 be in contact with the pad surface 22 at a smaller area, so the user must touch the pad surface 22 not with the finger cushion of the thumb F1, but with the fingertip thereof. By positioning the thumb F1 and the forefinger F2 as described above, the user can easily touch the pad surface 22 of the touch pad 2 with the fingertip portion of the thumb F1 in an orthogonal direction because of the structure of the fingers. As a result, the operability can also be improved. In addition, as described above, the pad surface 22 of the touch pad 2 is lower than the front surface 10a (closer to the back surface 10b), so the user can easily get the thumb F1 more orthogonal to the pad surface 22, which can further improve the operability.

It should be noted that when the user's forefinger F2 is placed on the finger placement portion 23, the finger placement portion 23 receives a force applied from the top surface 10c side to the bottom surface 10d side (in the direction of an arrow A shown in FIG. 9).

Figures 10A, 10B, 10C:
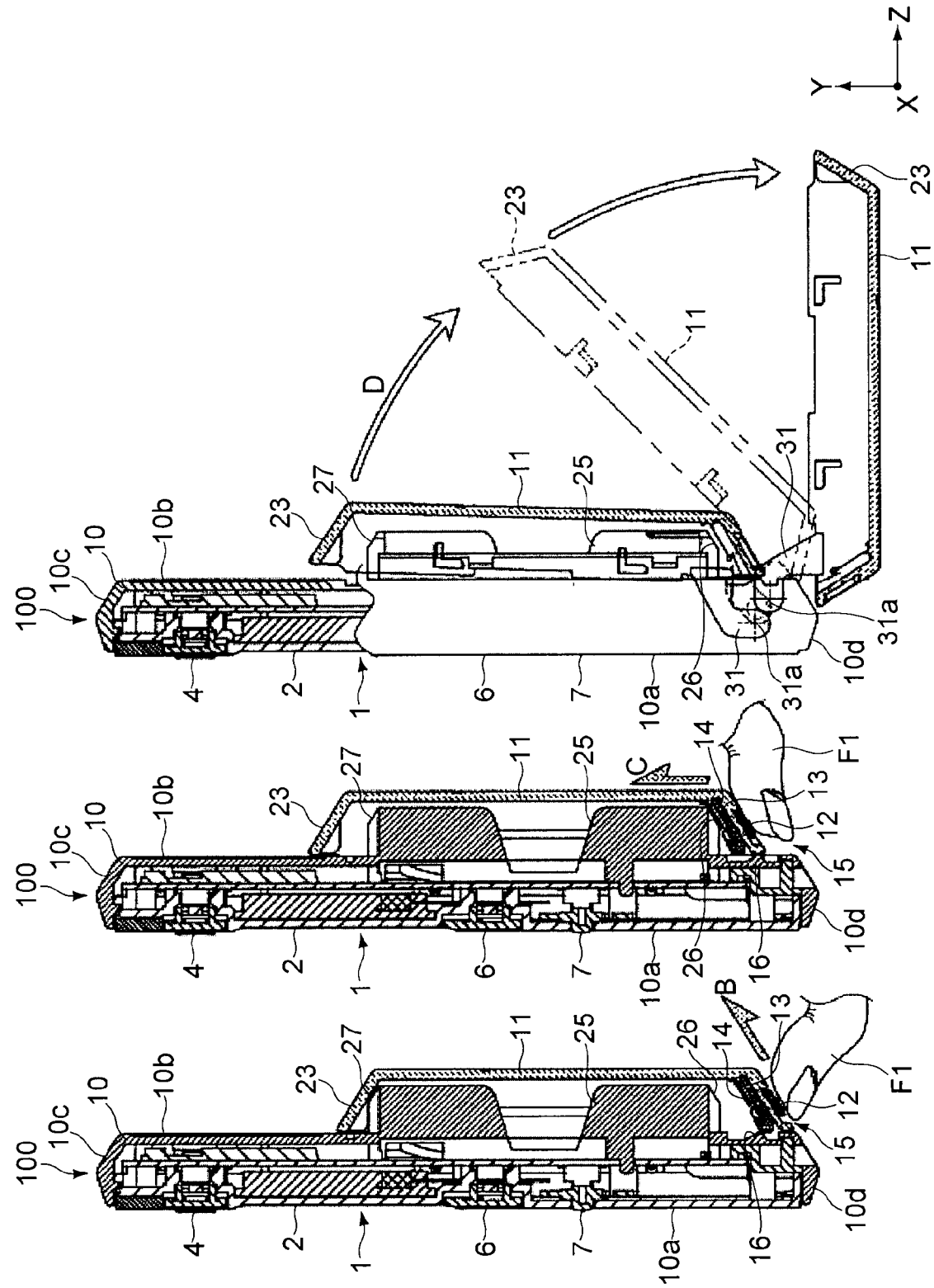
FIGS. 10A to 10C illustrate a continuous operation state in which the battery cover of the remote controller according to the embodiment of the present invention, viewed from a right side, is slid and opened.
Figure 11A:
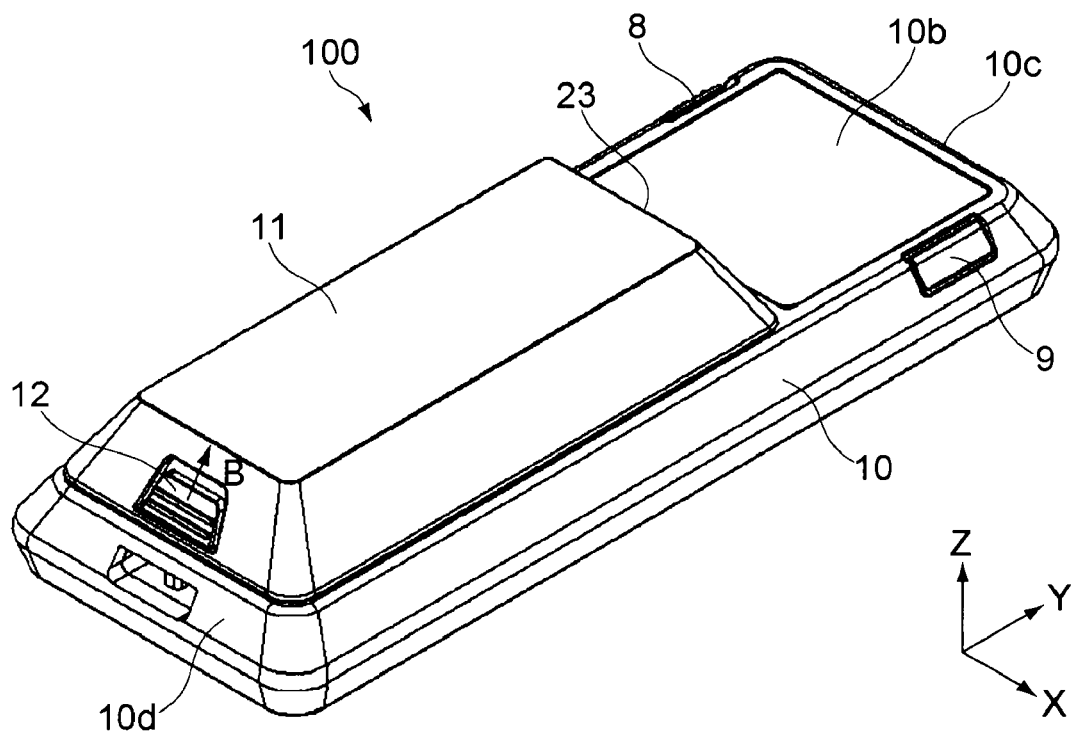
FIGS. 11A and 11B are perspective back side views showing a state in which the battery cover of the remote controller according to the embodiment of the present invention is slid.
Figure 11B:
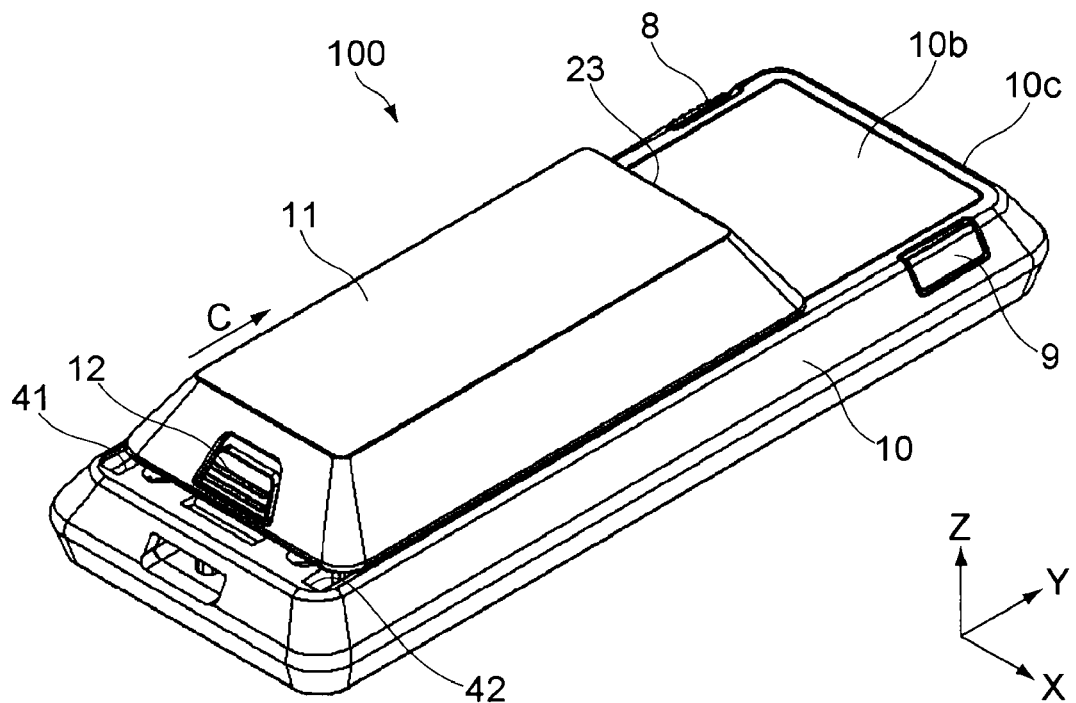
Figure 12A:
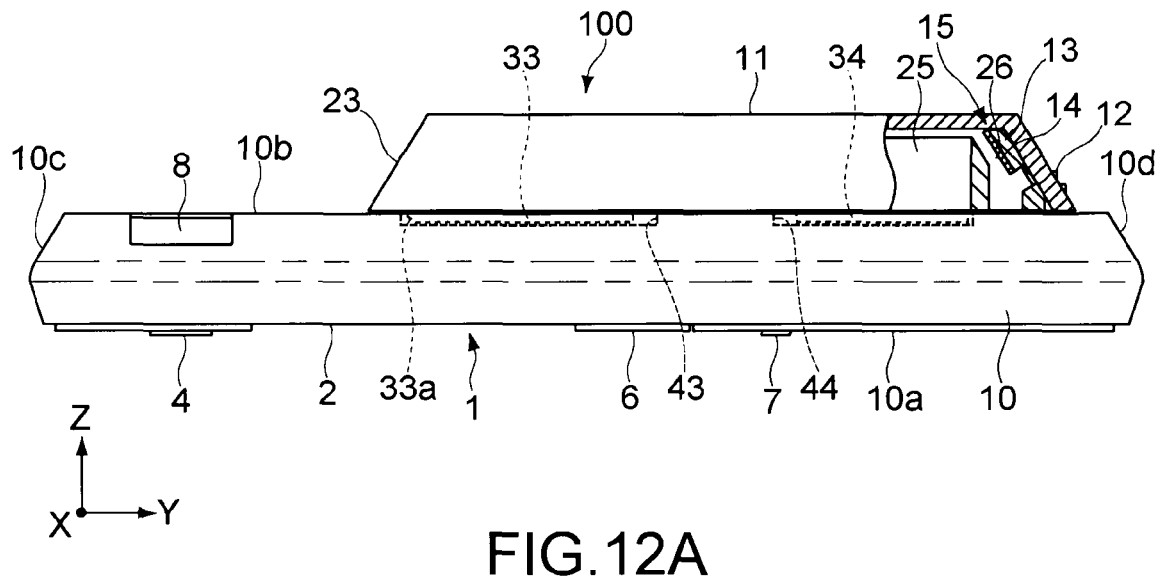
FIGS. 12A and 12B are right side views showing a state in which the battery cover of the remote controller according to the embodiment of the present invention is slid.
Figure 12B:
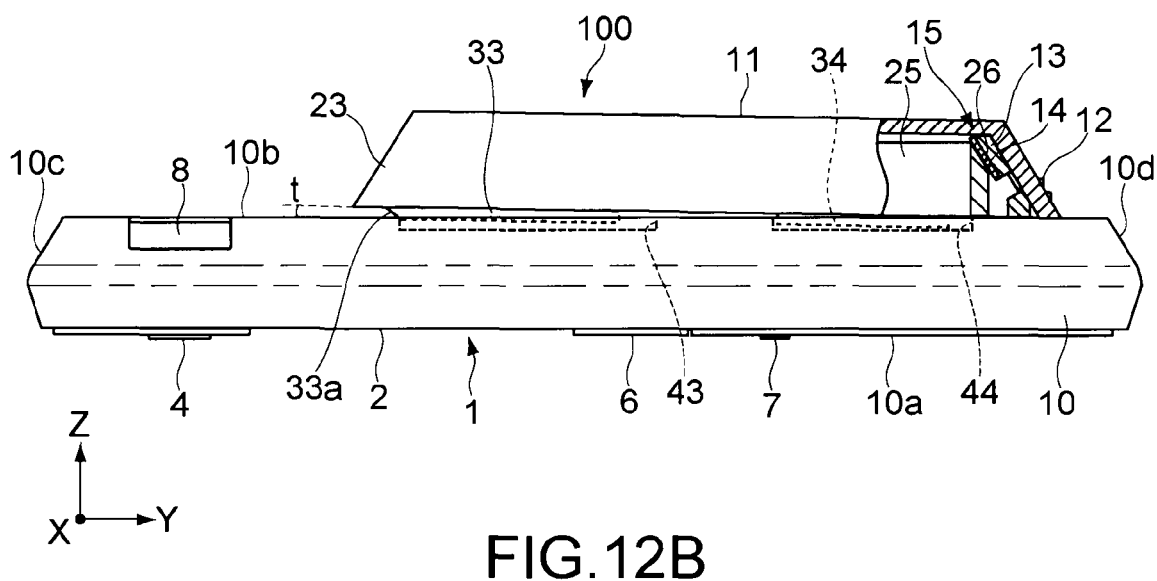
Figure 13:
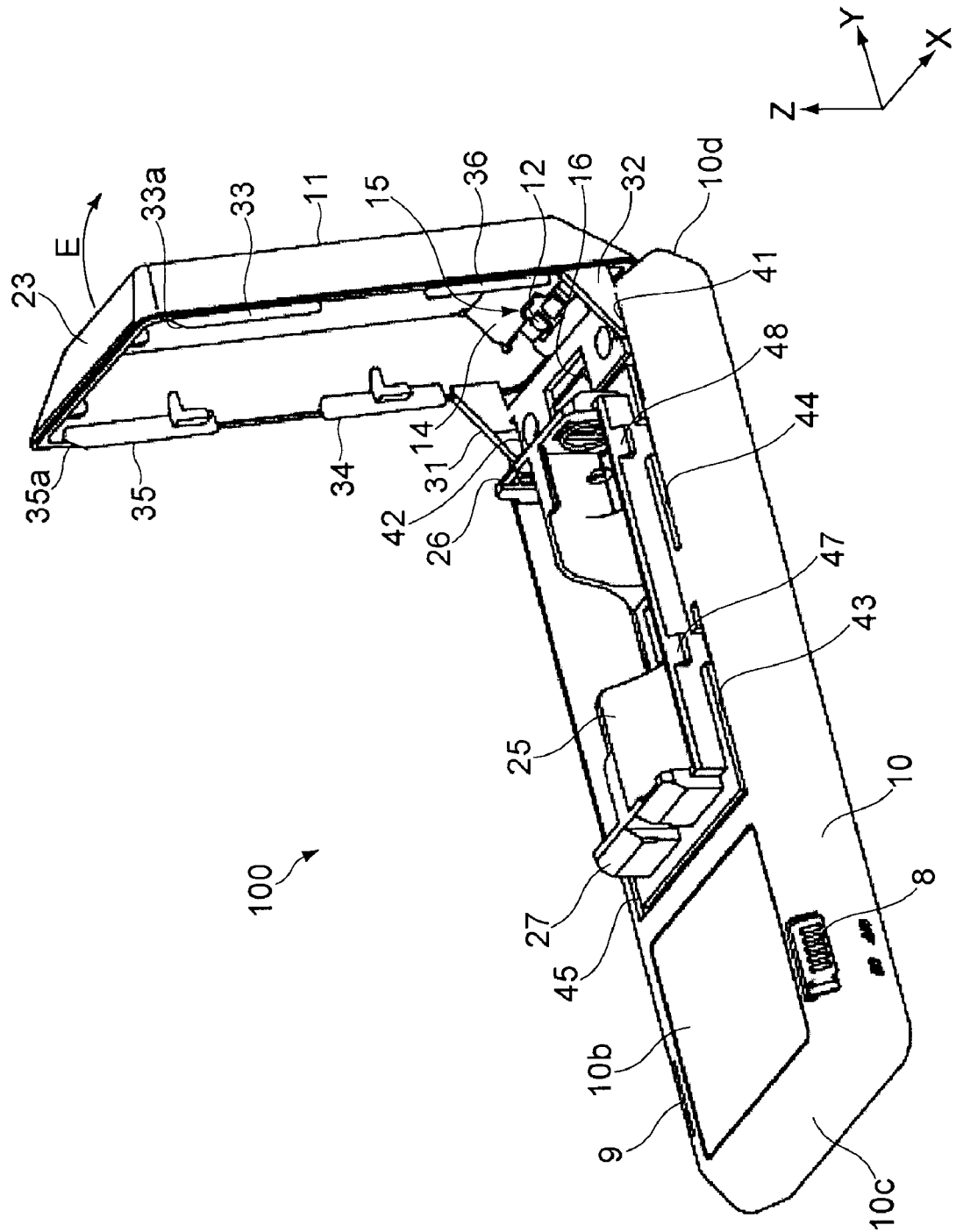
FIG. 13 is a perspective view of the remote controller according to the embodiment of the present invention, whose battery cover is opened.

Next, a description will be given on the operation of the battery cover 11 of the remote controller 100 structured as described above. FIGS. 10A to 10C illustrate a continuous operation state in which the battery cover 11, viewed from the right side, is slid and opened. FIGS. 11A and 11B are perspective back side views showing a state in which the battery cover 11 is slid. FIGS. 12A and 12B are right side views showing a state in which the battery cover 11 is slid. FIG. 13 is a perspective view showing a state in which the battery cover 11 is opened.

First, in a state shown in FIG. 11A, when the user applies a force in the direction of an arrow B of FIGS. 10A and 11A while pressing the unlock button 12 of the lock mechanism 15, the unlock button 12 is pressed up in the direction of the arrow B against a biasing force of the biasing member 13 as shown in FIG. 10A. As a result, the engagement between the unlock button 12 and the nail portion 16 of the back surface 10b is released and the unlock button 12 is moved so as to get on the nail portion 16.

Subsequently, as shown in FIGS. 10B and 11B, when the user applies a force to the vicinity of the unlock button 12 in the direction of an arrow C, the battery cover 11 is slid in the direction of the arrow C while the convex portions 33 to 36 of the battery cover 11 are guided along the slide grooves 43 to 46 of the battery containing portion 25. This slide releases respective engagements between the engagement portions 37 to 40 on the inner surface of the battery cover 11 and the protrusions 47 to 50 of the battery containing portion 25, thereby allowing the battery cover 11 to rotate (open and close).

As shown in FIG. 10C, in a state where the battery cover 11 is unlocked, when the user applies a force to the battery cover 11 in the direction of an arrow D, the rotation axis portions 31 and 32 of the battery cover 11 are rotated to thereby open the battery cover 11, leading to a state shown in FIG. 13. It should be noted that as shown in FIG. 10C, the bosses 31a and 32a of the rotation axis portions 31 and 32 are respectively engaged with the edge portions of the engagement holes 41 and 42, thereby causing the battery cover 11 to stop at a position at approximately 90° with respect to the back surface 10b.

As described above, to open the battery cover 11 of the remote controller 100, the user should press up and unlock the unlock button 12 and slide the battery cover 11 in the direction of the arrow C by applying the force in the direction of the arrow C of FIGS. 10B and 11B. On the other hand, as explained with reference to FIG. 9, the force in the direction opposite to the arrow C, i.e., the direction of the arrow A is applied to the finger placement portion 23 when the user performs remote control with the remote controller 100. Thus, it can be reliably prevented that the battery cover 11 is unintentionally detached when the remote controller 100 is operated.

Further, the battery cover 11 is rotated to open while the rotation axis portions 31 and 32 engage with the back surface 10b, which can cause the battery containing portion 25 to be exposed. Therefore, the user can replace the batteries with the battery cover 11 attached to the casing 10, which can prevent a loss of the battery cover 11 at the time of replacement.

In addition, as shown in FIG. 12A, immediately after the unlock button 12 is unlocked, the battery cover 11 is slid in parallel to the back surface 10b. When the battery 11 is further slid, the slopes 33a and 35a of the convex portions 33 and 35 of the battery cover 11 get over the end portions of the slide grooves 43 and 45 of the battery containing portion 25 on the top surface 10c side (on the left side in FIG. 12B), and get on the back surface 10b, as shown in FIG. 12B. At this time, the cover sheet 14 covering the biasing member 13 of the lock mechanism 15 also gets on the slope 26 of the battery containing portion 25 while being in contact therewith. As a result, the battery cover 11 is opened by a predetermined angle t.

After that, the user can therefore easily open the battery cover 11 by, for example, putting the finger into a space of the predetermined angle t. In addition, in a case where the user holds the remote controller 100 with the bottom surface 10d facing downward as shown in FIG. 9, when opened by the predetermined angle t, the battery cover 11 naturally opens toward the bottom surface 10d side by its self-weight without any user's operation. This structure therefore can save the trouble of the user at the time of the battery replacement. It should be noted that the angle t ranges from about 5° to 10° in this embodiment, but is not limited thereto and can of course be changed depending on the size of the slopes 33a and 35a.

In addition, as shown in FIG. 13, in the state where the battery cover 11 is opened up to the position at approximately 90° as described above and engaged with the bosses 31a and 32a of the rotation axis portions 31 and 32, when a force is applied in the direction of an arrow E of FIG. 13, the rotation axis portions 31 and 32 are elastically deformed inwardly by degrees. This results in releasing the engagement between the bosses 31a and 32a and the engagement holes 41 and 42, respectively, and causing the battery cover 11 to detach from the back surface 10b. With this structure, even when the user erroneously applies a force to the battery cover 11 with the battery cover 11 open, the battery cover 11 can be prevented from being broken due to, for example, the break of the rotation axis portions 31 and 32.

The present invention is not limited to the embodiment described above, and can of course be variously changed without departing from the gist of the present invention.

In the embodiment described above, the finger placement portion 23 is formed of a part of the battery cover 11, but may be provided separately from the battery cover 11. In this case, the finger placement portion may be a convex portion formed so that the user can place the finger in the approximately perpendicular direction, a concave portion formed so that the finger is fitted thereto, or the like. In the case where the finger placement portion is the convex portion, it may be formed integrally with the back surface or separately therefrom. Further, a member whose material is different from the back surface of the casing and whose friction coefficient is high, such as a rubber sheet, may be provided on the back surface.

In the embodiment described above, the position of the touch pad 2 on the front surface 10a of the casing 10 corresponds to that of the finger placement portion 23 on the back surface 10b. The position of another operation portion such as a button, a jog dial, or a touch panel may of course correspond to that of the finger placement portion 23.

In the embodiment described above, the scroll guide portion 21 is provided as the plurality of continuous convex portions, but may have any other configuration as long as it can give the user a tactual guide to tell the position and direction of the scroll operation. For example, the scroll guide portion 21 may be a plurality of continuous concave portions or may be formed so that a plurality of members whose material is different from the pad surface of the touch pad is buried in the pad surface in succession.

In the embodiment described above, the remote controller 100 is explained as a device for operating the presentation software of the PC. The remote controller 100 may be a device for remotely controlling another electronic apparatus such as a television set, AV equipment, a game machine, or an air conditioning apparatus.

Further, the remote controller 100 transmits the various operation signals to the electronic apparatus such as the PC via Bluetooth (registered trademark), but may transmit the various operation signals via another wireless communication standard such as an infrared communication, a WLAN (wireless local area network), or a WUSB (wireless universal serial bus).

In the embodiment described above, the remote controller is applied as an example of the portable electronic apparatus according to the present invention. In addition, the present invention can be applied to any other portable electronic apparatuses such as a mobile phone, a portable game machine, portable AV equipment, and an electronic dictionary.

What is claimed is:

1. A portable electronic apparatus, comprising:
   a casing including a front surface and a back surface;
   a touch pad disposed at a first position on the front surface and operated by a first finger of a user for an input; and
   a finger placement portion disposed at a second position on the back surface, the second position disposed opposite the first position, the finger placement portion guiding a second finger of the user to be placed thereon, wherein
   the touch pad includes a scroll guide portion provided on a surface thereof, the scroll guide tactually guiding the first finger of the user to tell the user an operation direction and an operation position of the scroll operation.

2. The portable electronic apparatus as set forth in claim 1, further comprising:
   a containing portion disposed at the back surface and capable of containing a battery; and
   a battery cover protruded from the second position of the back surface so as to cover the containing portion and form the finger placement portion.

3. The portable electronic apparatus as set forth in claim 1, wherein the touch pad includes an operation surface parallel to the front surface and positioned closer to the back surface than the front surface.

4. The portable electronic apparatus as set forth in claim 3, wherein the touch pad is subjected to a scroll operation with the first finger of the user for an input and includes a scroll guide portion provided on the operation surface.

5. The portable electronic apparatus as set forth in claim 1, wherein the back surface includes a finger placement portion, the finger placement portion being disposed opposite a center of the touch pad provided on the front surface.

6. The portable electronic apparatus as set forth in claim 1, wherein the second finger of the user is placed on the finger placement portion and the first finger of the user is orthogonal to the touch pad during operation of the apparatus.

7. The portable electronic apparatus as set forth in claim 1, wherein an operation surface of the touch pad is recessed from the front surface.

8. A portable electronic apparatus, comprising:
a casing including a front surface and a back surface;
a touch pad disposed at a first position on the front surface and operated by a first finger of a user such that a movement of the first finger along the touch pad performs a scroll operation; and
a finger placement portion disposed at a second position on the back surface, the second position disposed opposite the first position, the finger placement portion guiding a second finger of the user to be placed thereon, wherein
the touch pad includes a scroll guide portion provided on a surface thereof, the scroll guide tactually guiding the first finger of the user to tell the user an operation direction and an operation position of the scroll operation.

* * * * *